March 7, 1961   R. F. ESTOPPEY   2,974,283
WATTMETER POTENTIAL CIRCUIT POWER COMPENSATION ARRANGEMENT
Filed Nov. 4, 1957   3 Sheets-Sheet 1

ROYDEN F. ESTOPPEY
INVENTOR.

BY
Rudolph J. Junick
ATTORNEY

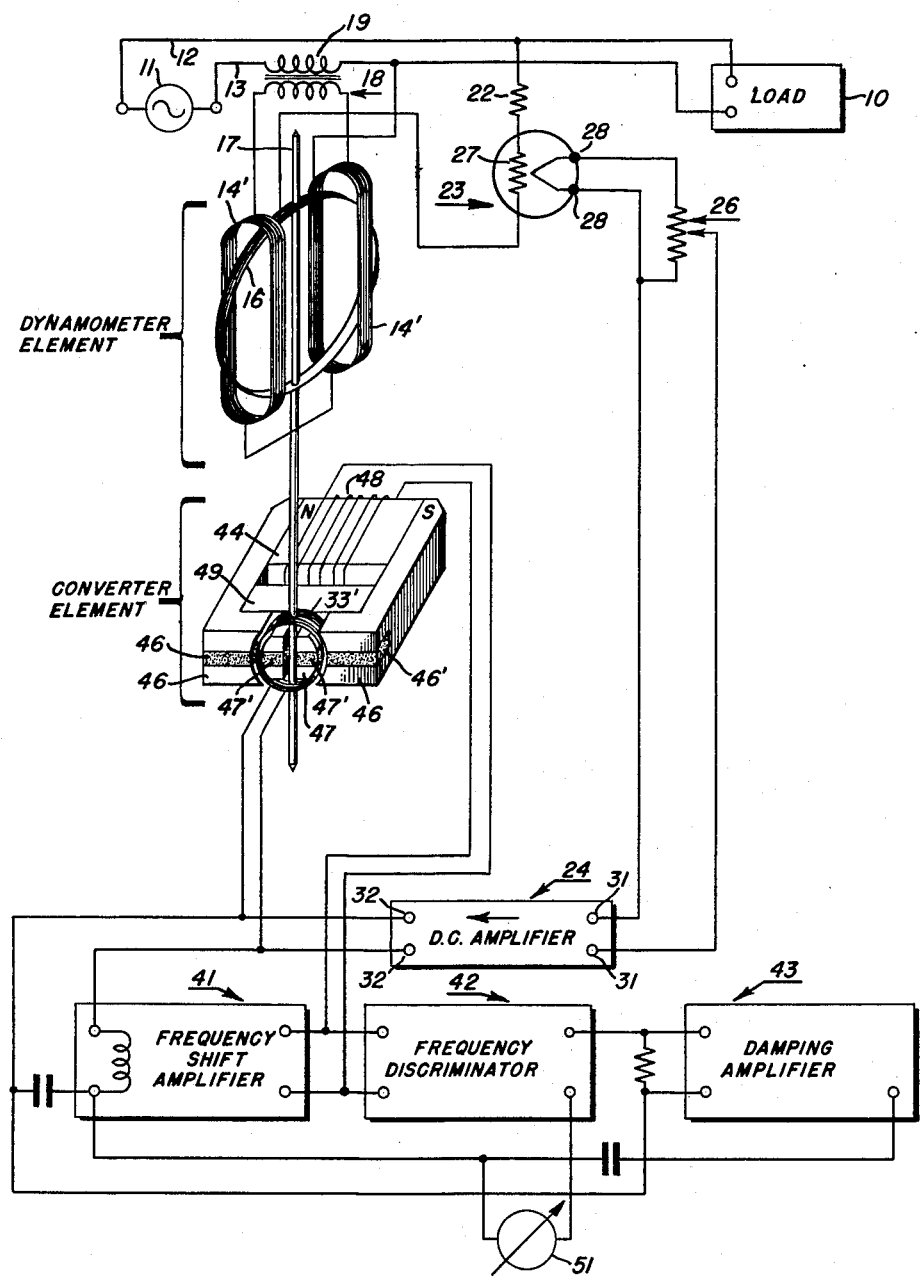

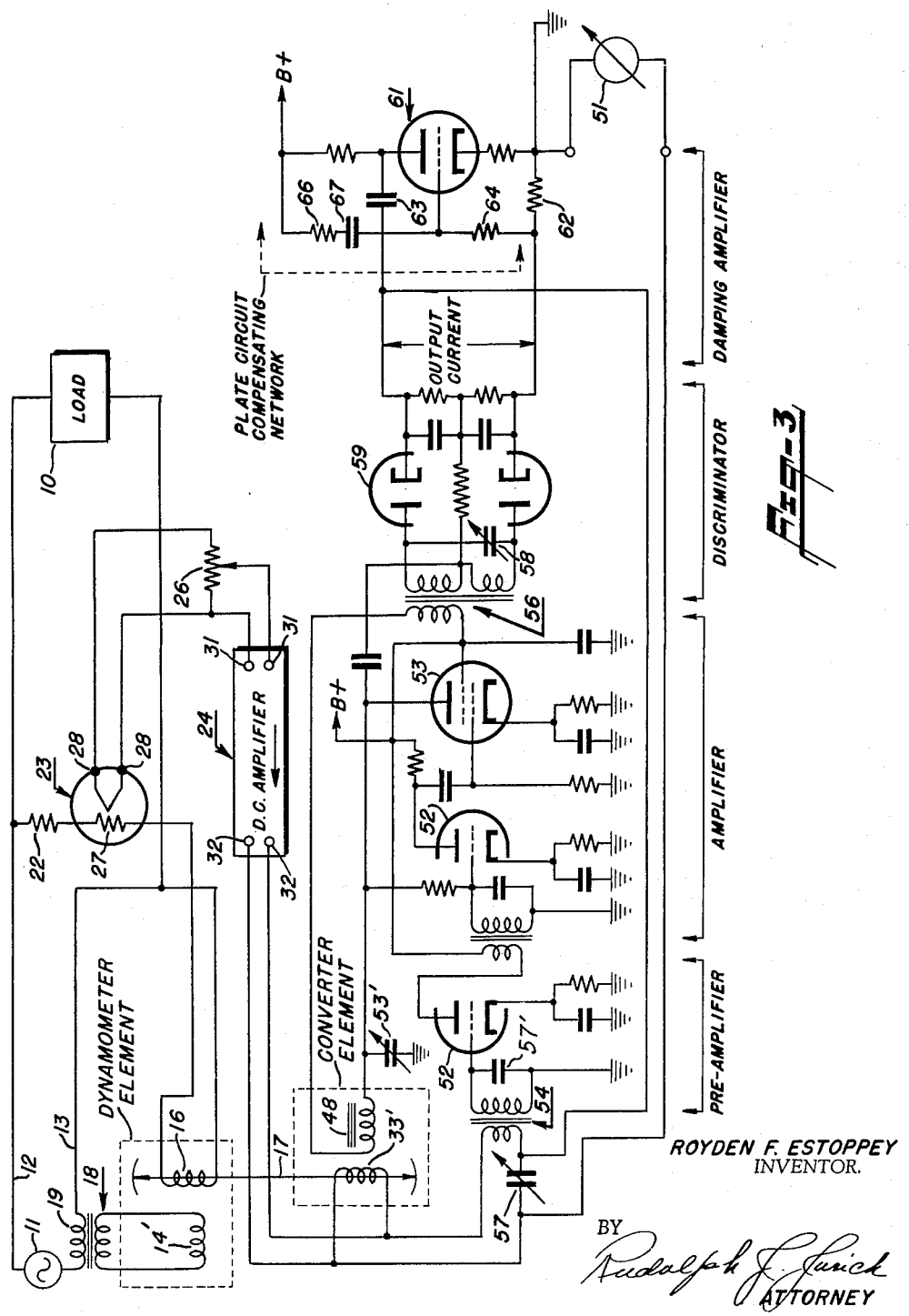

United States Patent Office 2,974,283
Patented Mar. 7, 1961

2,974,283

WATTMETER POTENTIAL CIRCUIT POWER COMPENSATION ARRANGEMENT

Royden F. Estoppey, Berkeley Heights, N.J., assignor, by mesne assignments, to Daystrom, Incorporated, Murray Hill, N.J., a corporation of New Jersey Filed Nov. 4, 1957, Ser. No. 694,357

2 Claims. (Cl. 324—144)

This invention relates to an electrical instrument circuit and more particularly to a novel electrical arrangement for correcting the indications of a wattmeter for the power consumed by the potential circuit of the wattmeter and other instruments connected to the line.

Although the compensating arrangement of this invention is of general application in the field of electrical measurements, the description will be limited to the use of such arrangement in connection with an electrodynamometer wattmeter. It may also here be pointed out that arrangements of this character generally are referred to as circuits for compensating for the power consumed by the potential coil of the measuring instrument as, for example, the potention coils of an electrodynamometer wattmeter. More precisely, however, such circuits correct the meter indication so that the power consumed by the potential soil, per se, does not result in an increased wattage indication.

Contemporary electrodynamometer wattmeters often utilize compensating windings connected in series with the wattmeter potential circuit and which are inductively coupled to coils in the wattmeter current circuit. The compensating windings thus carry the current drawn by the potential circuit; the resulting magnetic field opposing the field produced by the current flow through the wattmeter current coils to thereby compensate for the current drawn by the wattmeter potential circuit. This conventional wattmeter potential circuit compensating arrangement has distinct limitations on its application. For example, such a system generally cannot be used effectively at frequencies of 400 cycles per second, and above. Further, because the compensating coils are located adjacent the current carrying field coils, they are subject to large temperature changes which adversely affects the accuracy of indication. The addition of copper to the moving coil circuit produces moving coil error.

An electrodynamometer mechanism is utilized as a wattmeter in my device. The fixed coils of the meter may be coupled to the line through a current transformer to provide a measure of the line current, and the movable coil thereof being connected across the load through a resistor to provide a measure of the load voltage, in the usual manner. The electrodynamometer mechanism develops a mechanical torque which is proportional to the instantaneous product of currents in the field and movable coils, which product is a measure of the instantaneous power. Compensation for the power dissipated in the potential winding is obtained by the use of a thermocouple in series with the potential circuit. The direct current thermocouple output, which is responsive to the square of the load voltage, is connected through a resistor to the wire-wound, movable coil of a D.-C. instrument, which coil is mounted on the same staff as the movable coil of the electrodynamometer element; the said movable coil operating in a unidirectional magnetic flux field established by a permanent magnet. The torque produced by current flow in the movable coil, which is directly proportional to the power loss in the wattmeter potential winding, opposes the electrodynamometer torque whereby the resulting staff deflection is directly related to the true load power. It will be apparent, then, that variations in load voltage are of no major concern since the output of the thermocouple follows the square-law as does the power dissipated in the potential winding for changes in load voltage. Variations in frequency are of no consequence since the thermocouple frequency spectrum ranges from direct current to extremely high frequencies. The thermocouple may be located at a distance from the wattmeter field coils and not subjected to large temperature variations produced by the current flow in the field coils. Thus, it will be seen that my novel wattmeter potential circuit compensation arrangement is less sensitive to frequency and temperature variations than compensation circuits of conventional arrangement.

The invention has utility, of course, in potential circuit power compensation applications for other type wattmeters than described above. In the specification below, I shall describe also my novel compensation arrangement as applied to a product resolver connected as a wattmeter, which product resolver is disclosed in a co-pending United States patent application of Roswell W. Gilbert, Serial No. 322,438, filed November 25, 1952, now Patent No. 2,838,232 and entitled Arrangement for Converting a Mechanical Torque to a D.C. current.

An object of this invention is the provision of a novel arrangement for compensating for the power dissipated in the potential circuit of a wattmeter which arrangement is not subject to many of the frequency and temperature errors of contemporary compensating arrangements.

An object of this invention is the provision of a simple wattmeter potential circuit power compensation means which includes a thermocouple having a square law response for measurement of the power dissipated in the wattmeter potential circuit.

An object of this invention is the provision of a wattmeter potential circuit power compensation arrangement for an electrodynamometer type wattmeter having a field coil and a movable coil, the wattmeter movable coil being rotatable in a direction and magnitude in response to the torque of the wattmeter, the said compensation arrangement comprising a thermocouple responsive to the wattmeter potential circuit current, a D.-C. instrument having a wire-wound movable coil rotatably supported in a magnetic flux field, the said D.-C. instrument movable coil being connected to the wattmeter movable coil for rotation therewith, and means connecting the direct current output from the thermocouple to the said D.-C. instrument movable coil to produce a torque therein in opposition to the electrodynamometer element torque, the resultant torque producing a coil deflection proportional to the true load power.

An object of this invention is the provision of an arrangement for correcting for the power dissipated in the potential circuit of a wattmeter, which wattmeter includes an electrodynamometer mechanism having a movable coil and a field coil individually energized by the load current and potential, the said compensating arrangement comprising a thermocouple having an input connected to the said wattmeter potential circuit, means converting the said thermocouple output to a proportionate torque, and means applying the said torque in opposition to the wattmeter movable coil torque.

An object of this invention is the provision of an arrangement for compensating for the power dissipated in the potential circuit of a wattmeter, which wattmeter comprises an electrodynamometer mechanism having a movable coil secured to a staff, the said staff being rotatable in direction and magnitude in response to the electrodynamometer mechanism energization, electromagnetic means mechanically coupled to the said staff and developing an alternating current component having a magnitude and phase sense relating to rotation of the staff, means phase-rectifying the said alternating current component to produce a corresponding output current, the said compensating arrangement comprising a thermocouple having input terminals connected to the wattmeter potential circuit, means feeding the said thermocouple output current and the said output current from the phase-rectifying means back into the said electromagnetic means to return said staff to its initial position, the said output current from the said phase-rectifying means being a measure of the true load power.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views:

Figure 2 is a diagrammatic representation of my novel arrangement applied to a product resolver connected as a wattmeter; and Figure 3 is a schematic circuit diagram of the product resolver shown in Figure 2.

Figure 1:
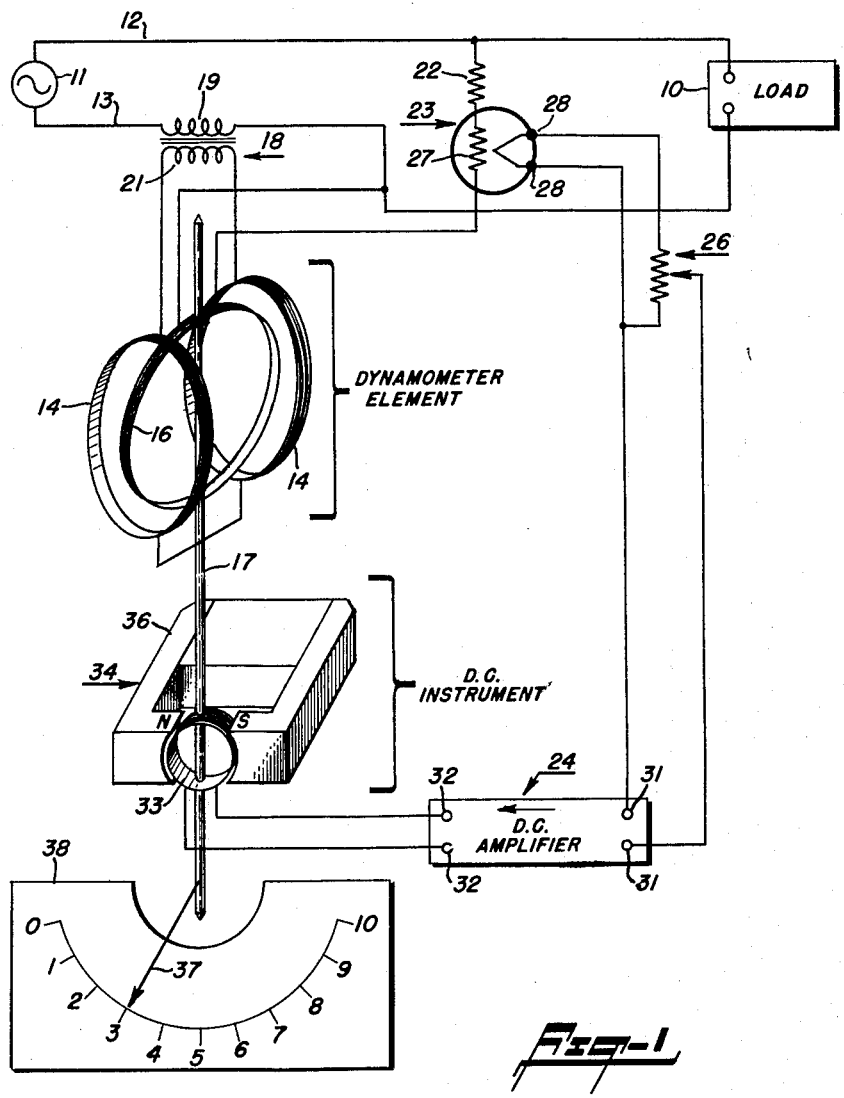
Figure 1 is a diagrammatic representation of my novel potential circuit power compensating arrangement applied to a wattmeter.

Reference is first made to Figure 1 of the drawings wherein the wattmeter is shown connected for measurement of the power of the load 10 supplied by an alternating current source 11 through lines 12 and 13. The source 11 may comprise any suitable alternating current supply such as the ordinary 110 volt 60 cycle per second source. The power consumption of any type load 10 may be measured. The wattmeter comprises an ordinary dynamometer element having field coils 14, 14 and a movable coil 16, the latter being secured to a staff 17. The electrodynamometer element is generally similar to that used in conventional dynamometer indicating instruments.

The input current for the field coils is derived from a current transformer 18 in the wattmeter current circuit; the primary winding 19 of which transformer is connected in series circuit with the supply line 13, and the secondary winding 21 being connected to the field coils in series. The input current for the movable coil 16 is derived from the wattmeter potential circuit which includes a dropping resistor 22 connected in series circuit relation with the movable coil across the load 10. Thus, the fixed field coils 14 are fed a current which is proportional to the load current while the movable coil is fed a current which is proportional to the load potential.

The electrodynamometer element described thus far is substantially of conventional design. My invention is directed to an arrangement for compensating of error in the wattmeter output indication produced by the power consumed in the potential circuit of the wattmeter, which arrangement includes a thermocouple 23, the output of which is connected to a direct current amplifier 24 through a potentiometer 26. The thermocouple heater 27 is connected in series circuit with the movable coil 16 of the electrodynamometer element in the potential circuit of the wattmeter. The thermocouple output terminals 28 are connected across the potentiometer 26, while the movable arm of the potentiometer and the common terminal thereof are connected to the input terminals 31 of the D.C. amplifier 24.

The amplifier output voltage from the terminals 32 thereof is fed to the wire-wound movable coil 33 of the D.C. instrument, designated 34, through conventional hair springs, not shown in the drawings; said movable coil operating in a unidirectional magnetic flux field established by the permanent magnet 36. The movable coil 33 of the instrument 34 is mounted on the staff 17 and is thereby rotatable with the electrodynamometer moving coil 16. Also secured to the staff 17 is a pointer 37 movable over a scale 38 calibrated in suitable power terms, such as watts. The potentiometer 26 provides for the adjustment of the voltage supplied to the movable coil 33 of the instrument. The direct current amplifier 24 between the potentiometer 26 and movable coil 33 is of any suitable design.

In operation, the deflection of the movable coil 16 of the electrodynamometer element is proportional to the product of the currents in the coils 14 and 16, multiplied by a constant. The total power, as indicated by the deflection of the coil 16, includes the power supplied the wattmeter potential circuit, which includes the power dissipated in the series connected resistor 22 and movable coil 16. The thermocouple heater 27 is in series circuit with the wattmeter potential circuit whereby the D.C. output voltage of the thermocouple is directly related to the power dissipated in the wattmeter potential circuit. The thermocouple output voltage is fed to the D.C. instrument movable coil 33 through the potentiometer 26 and D.C. amplifier 24; the resultant torque on the coil 33 producing a deflection opposite that produced in the dynamometer element. The resultant deflection of the pointer 37 is the difference between the deflection produced by the torque of the dynamometer element and that produced by the D.C. instrument. Correct potential circuit power compensation is obtained by opening the load 10 and adjusting the potentiometer 26 for zero deflection of the pointer 37. Once this is done, the pointer 37 indicates the true power of the load. Obviously, if a voltmeter, or other instrument or device, is connected across the load, the power taken by the instrument or device may also be compensated along with the power of the potential circuit.

An important advantage of my novel potential circuit compensation arrangement over contemporary compensating arrangements lies in the fact that the wattmeter may be coupled to the line through a current transformer. Meters employing the conventional, separate compensating coils cannot be used with a current transformer because the current that flows through the compensating winding remains fixed whereas the current flowing through the normal potential, or field, winding depends upon the turns ratio of the transformer. Further, it will be noted that the thermocouple 13 may be positioned a distance from the field coils 14 of the wattmeter at a location which is not subject to great changes in temperature such as are produced by the heating effects of the current flow through the wattmeter field coils. Thus, the potential circuit compensation arrangement of my invention is not sensitive to temperature changes created by heat produced in the wattmeter if the thermocouple is suitably located, or positioned. Obviously, frequency changes are of no major concern in my compensation arrangement, either, since the thermocouple is responsive to wide variations of input frequency from direct current to high frequency currents.

The novel wattmeter potential circuit power compensation arrangement of my invention is not limited to use with a D.-C. instrument of the type illustrated in Figure 1, but may also be used with a product resolver connected as a wattmeter. In Figures 2 and 3 of the drawings, I show my novel potential circuit power compensation arrangement employed in a product resolver of the type disclosed in the above-mentioned United States patent application of Roswell W. Gilbert. The product resolver disclosed in the Gilbert patent application includes an electrodynamometer element similar to that shown in Figure 1; the fixed coils thereof being transformer coupled to the line through a current transformer to provide a measure of the load current, and the movable coil thereof being connected across the load through the series resistor and thermocouple heater to provide a measure of the load voltage. The electrodynamometer element develops a mechanical torque which is proportional to the instantaneous product of currents in the field and movable coils; which product is a measure of the instantaneous power. Unlike the arrangement of Figure 1, this torque of the electrodynamometer element is substantially balanced by a converter element having a permanent magnet field and a movable coil carrying a balancing output current developed by the unbalance motion of the movable system. The system has added thereto position sensing and amplification functions to make the balance action automatic. This product resolver system is provided with the potential circuit power compensation arrangement of Figure 1 wherein the D.-C. amplifier output is fed to the movable coil of the converter element for compensation of the power dissipated in the wattmeter potential circuit.

Reference is now made to Figure 2 wherein the product resolver is shown connected as a wattmeter for measurement of the true power of the load 10 as supplied by the alternating current source 11, as in Figure 1. The product resolver comprises the dynamometer and converter elements together with a frequency shift amplifier 41, frequency discriminator 42 and damping amplifier 43, which product resolver is substantially identical to that disclosed in the above-mentioned Gilbert patent application. Suffice to say, for present purposes, the dynamometer element includes field coils 14', 14', and a movable coil 16, the latter being secured to the staff 17. The dynamometer element is designed for maximum differential coupling by flattening and compacting the field coils 14', 14' about the movable coil. Unlike the dynamometer element of Figure 1, the mechanism of Figure 2 operates at a point of zero mutual inductance thereby eliminating coupling difficulties normally experienced in deflection instruments. As in the wattmeter of Figure 1, the input current for the field coils is derived from the current transformer 18, and the movable coil 16 is connected in series with the resistor 22 and thermocouple heater 27 across the load 10.

The converter element of the wattmeter for deflection sensing and conversion to torque for balance against the dynamometer torque comprises a D.-C. mechanism having a movable coil 33' secured to the common staff 17. A permanent magnet 44 is utilized to establish a unidirectional magnetic flux field between the pole pieces 46 and the core 47. In accordance with conventional instrument practice, current is brought to the movable coil 33' by means of conventional hair springs (not shown) and the movable coil will rotate about the axis formed by the staff 17 in a direction and to an extent depending upon the magnitude of the D.-C. current flowing therein. A varying magnetic flux field is also provided across the movable coil air gap by means of a coil 48, here shown diagrammatically as encircling the magnet 44, said coil being energized by an appropriate high-frequency current. It is apparent, therefore, that the movable coil 33' rotates in a magnetic flux gap that includes the steady flux field of the permanent magnet 44 and the varying flux field produced by the coil 48. When the movable coil 33' is in its normal, zero-center position, as shown in the drawing, the A.-C field flux linkage is zero. However, deflection of the movable coil 33' causes such coil to link, proportionally, the A.-C. component of the flux field and an A.-C. potential is induced therein, such potential having a magnitude and phase proportional to the degree and direction of coil deflection. Thus, deflection of the movable coil 33', in response to the torque produced by the dynamometer element, will induce an A.-C. voltage in the movable coil 33' which can be amplified.

The developed A.-C. coil potential is directly proportional to the frequency of the current flowing in the coil 48 and the operational quality of the wattmeter is proportional to increasing frequency until limited by some secondary consideration such as losses in the field structure or the movable coil. The solid iron flux paths normally used in D.-C. instrument structures are not efficient for the high-frequency component of the magnetic flux and, conversely, the magnetic materials suitable for high frequencies have permeabilities insufficient for the relatively high level of steady flux of the permanent magnet. A composite magnetic structure is, therefore, employed wherein the pole pieces 46, made of soft-iron, are provided with milled slots, and rectangular blocks 46', of carbonyl iron powder bonded and insulated by a resin, are cemented or otherwise bonded in the pole-piece slots. The core 47, made of soft-iron and cemented, or brazed, to a bar 49 of non-magnetic material, is also provided with appropriate slots accommodating the powdered iron inserts 47'. As shown in the drawings, the core also includes a transverse vertical slot through which the staff 17 passes. The non-magnetic bar 49 is secured to the pole pieces 46 whereby the core sections are spaced relative to the opposed pole pieces to provide the circular air gap for the coil 33'. The powdered iron inserts 46' and 47' provide a path for the high frequency alternating magnetic flux, and the soft iron pole pieces 46 and core 47 provide a path for the steady unidirectional flux of the permanent magnet 44.

The converter element, therefore, serves to convert very small deflections of the staff 17 into a high-frequency component of voltage which is amplified by the amplifier 41, phase-rectified by the frequency discriminator 42 and fed back into the movable coil 33' as a D.-C. current to substantially torque balance the system. The torque produced by the dynamometer element is, thereby, automatically converted into a proportionate D.-C. output current.

Since the system is operated at a very high feedback ratio, at least 50,000, and normally will oscillate despite the high phase velocity of the high-frequency amplifier section, it is necessary to provide dynamic damping by using a single stage damping amplifier 43 which is responsive to the output current and which feeds a derivative component of current back into the movable coil 33' of the converter element. The power at the load 10, which is the instantaneous product of current and voltage thereat, may be indicated on a suitably calibrated D.-C. instrument 51.

The product resolver system, as described thus far, is substantially shown and described in the above-mentioned co-pending patent application Serial No. 322,438. The present invention is directed to the arrangement for compensating for error in the power indication, which error is produced by the power consumed in the potential circuit of the wattmeter. Such compensation circuit includes the thermocouple 23, the output of which is connected to the direct current amplifier 24 through the potentiometer 26, as in Figure 2. The output terminals 32 of the D.-C. amplifier are connected to the movable coil 33' of the converter element in such a manner to produce a torque thereon which opposes the torque produced in the dynamometer element of the wattmeter. Thus, it will be understood, that the torque produced by the current flow through the coils of the dynamometer element is balanced by the torque resulting from the direct current output of both the D.-C. amplifier 24, and the frequency discriminator 42, in the converter coil 33'. The direct current output of the frequency discriminator 42 is, therefore, a measure of the true load power; the power dissipated in the wattmeter potential circuit being compensated for by the direct current output from the D.-C. amplifier 24.

Reference is now made to Figure 3 of the drawings which is a circuit diagram of the product resolver system of Figure 2. The D.-C. amplifier 24 is shown in block form in Figure 3, however, since any suitable D.-C. amplifier may be used; my novel power compensating arrangement not being dependent upon any particular D.-C. amplifier used. The current circuit of the wattmeter includes the fixed coil 14' which is connected to the output of the current transformer 18, the transformer primary winding 19 being connected in series with the line 13. The potential circuit of the wattmeter includes the movable coil 16 connected across the lines 12 and 13 through the series connected resistor 22 and thermocouple heater 27. The resulting electromagnetic reaction in the dynamometer element produces a torque in the staff 17 which torque produces a displacement of the movable coil 33' of the converter element from its normal, zero coupling position with respect to the high frequency field coil 48. The "amplifier" section, comprising one-half of the vacuum tube 52 and the tube 53, normally is in stable oscillation and feeds oscillating current to the field coil 48 which is tuned to resonance by the capacitor 53'. As explained above, deflection of the converter movable coil 33' produces therein an A.-C. component of potential having a magnitude and phase-direction proportional to the degree and direction of coil deflection. This A.-C. component is amplified by the "pre-amplifier" which consists of the other half of the vacuum tube 52. The input transformer 54 and the "discriminator" transformer 56 are of conventional cup-core construction and are resonated at the operating frequency of the system, say 200 kilocycles per second, by the associated capacitors 57' and 58, respectively. The bulk of the output impedance is in the field coil 48 and its associated capacitor 53', with the discriminator transformer 56 coupled by inserting its primary winding in series with the field coil 48, as shown. This phases the discriminator properly. Actually, the primary winding of the discriminator transformer consists of a relatively few turns, the number of turns determining the coefficient of coupling between the separately-resonated field coil 48 and the secondary winding that is connected to the dual diode rectifier 59.

The "discriminator" is a conventional balance type, as commonly used in radio practice, and is phased by the capacitive connection to the output stage plate. The D.-C. output of the discriminator, therefore, is balanced at the center frequency of the current supplied to the field coil 48 and is polarized with respect to frequency shift as the movable coil 33' deflects from its normal, zero position. It is pointed out that the converter field coil 48 and the discriminator transformer secondary winding are separately tuned to the same center frequency and coupled. The coupling coefficient may thus be selected to slightly overcouple the two resonant circuits to develop a double peaked impedance and phase characteristic identified with the overcoupled condition. Overcoupling in proper amount provides a method of simple adjustment of the system to any desired incremental sensitivity about the center-frequency point and a relatively high sensitivity over reasonable excursions from such center point.

Dynamic damping of the torque-balance system is desirable. This is done by means of the "damping amplifier" which comprises a single-stage amplifier tube 61 that is responsive to the output current of the discriminator and which feeds a derivative component into the movable coil 33' of the converter element. A potential is derived by passing the output current through a load resistor 62 and such potential is applied to the converter element movable coil 33' through a differentiating capacitor 63 having a time-constant against the plate network somewhat larger than the feedback period of the overall system. This supplies a time-derived loading component through the movable coil 33' in response to output current change. An additional input network connected to the plate voltage supply, and including the resistors 64, 66 and the capacitor 67, has a time-constant much larger than the feedback period and serves to compensate for plate supply ripple and transient components. The degree of damping is controlled by adjusting the values of the resistor 62 and capacitor 63 to obtain a magnitude and time-constant that is an optimum for the particular dynamometer-converter elements used and the actual feedback ratio. The "plate circuit compensating network" is adjusted to the point of disappearing transfer impedance between the plate supply and movable coil circuits at frequencies at least somewhat lower than the reciprocal of the feedback period. It will be noted that the damping circuit is reactively coupled and so cannot produce any D.-C. displacement error in the converter element.

Without my novel potential circuit power compensation arrangement, the D.-C. output current, as measured by the instrument 51, is equal at all times to the product of the currents in the coils 14' and 16, fed to the dynamometer element, multiplied by a constant. Obviously, the instrument is easily calibrated in suitable power terms. The total power, however, includes the power supplied the wattmeter potential circuit, which includes the series connected resistor 22 and movable coil 16. The power dissipated by the wattmeter potential circuit is compensated by means of the thermocouple output which feeds the D.-C. amplifier 24 through the potentiometer 26. The potential circuit power is indicated by opening, or removing, the load 10. With the load open, the potential circuit power is compensated by adjusting the potentiometer 26 so as to return the instrument 51 indication to zero. Once this is done, the wattmeter will read the true power of the load. Obviously, as mentioned above, if a voltmeter, or other instrument, is connected across the load, the power taken by the instrument may also be compensated along with the power of the potential circuit.

The potential circuit power compensation arrangement, as applied to the product resolver of Figures 2 and 3, is not sensitive to load voltage, or to the frequency of the source 11. Also, the thermocouple 23 may be located at a point removed from the heating effects of the current flow through the electrodynamometer element. Thus, all of the above-mentioned advantages of my novel potential circuit power compensation arrangement over contemporary compensating arrangements apply to the product resolver system of Figures 2 and 3, when connected as a wattmeter.

Having now described my invention in detail in accordance with the requirements of the patent statutes, various other changes and modifications will suggest themselves to those skilled in this art. It is intended that such changes and modifications may be made without departing from the scope and spirit of the invention as recited in the following claims.

I claim:

1. An arrangement for compensating for the power dissipated in the potential circuit of a wattmeter, which wattmeter comprises an electrodynamometer mechanism having a movable coil secured to a staff, the said staff being rotatable in direction and magnitude in response to the electrodynamometer mechanism energization, electromagnetic means mechanically coupled to the said staff and developing an alternating current component having a magnitude and phase sense relating to rotation of the staff, means phase-rectifying the said alternating current component to produce a corresponding output current, the said compensating arrangement comprising a thermocouple having input terminals connected to the wattmeter potential circuit, means feeding the thermocouple output current and the said output current from the phase-rectifying means back into the said electromagnetic means to return said staff to its initial position, the said output current from the said phase-rectifying means being a measure of the true load power.

2. An arrangement for compensating for the power dissipated in the potential circuit of a wattmeter of the electrodynamometer type, which wattmeter includes current and potential circuit elements connecting the said electrodynamometer field and movable coils to the load under measurement; a staff secured to said movable coil; a converter mechanism including a permanent magnet providing a steady magnetic flux across an air gap, a movable coil secured to said staff and rotatable in said air gap, a field coil energized by a high-frequency current and producing an alternating magnetic flux field in said air gap, said movable coil of the converter mechanism having a normal position of zero coupling with said alternating flux field; means amplifying the A.-C. component of voltage induced in said converter mechanism movable coil when the latter is displaced from its normal position; a discriminator phase-rectifying the said A.-C. component of voltage to produce an output current that varies in phase sense and magnitude with the displacement of the converter movable coil from its normal position; a feedback circuit for feeding the said output current into the movable coil of the converter mechanism; the said potential circuit compensating arrangement comprising a thermocouple having an input connected in series circuit with the said wattmeter potential circuit; means including a D.-C. amplifier connecting the thermocouple output to the said movable coil of the converter mechanism; the said thermocouple output and output current of the discriminator being fed into the converter mechanism movable coil in a direction to return such movable coil to substantially normal position, the said discriminator output being a measure of the true load power.

References Cited in the file of this patent

UNITED STATES PATENTS

| | | |
|---|---|---|
| 1,266,652 | Bard | May 21, 1918 |
| 2,434,544 | Boykin | Jan. 13, 1948 |
| 2,560,257 | Sias | July 10, 1951 |

OTHER REFERENCES

Publication, "Electrical Measurements," by Harris, 1952, pages 475–4771.